US008127155B2

(12) United States Patent
Baarman et al.

(10) Patent No.: US 8,127,155 B2
(45) Date of Patent: Feb. 28, 2012

(54) WIRELESS POWER ADAPTER FOR COMPUTER

(75) Inventors: David W. Baarman, Fennville, MI (US); Joshua K. Schwannecke, Portland, MI (US); Matthew J. Norconk, Traverse City, MI (US)

(73) Assignee: Access Business Group International LLC, Ada, MI (US)

( * ) Notice: Subject to any disclaimer, the term of this patent is extended or adjusted under 35 U.S.C. 154(b) by 446 days.

(21) Appl. No.: 12/349,540

(22) Filed: Jan. 7, 2009

(65) Prior Publication Data

US 2009/0177908 A1 Jul. 9, 2009

Related U.S. Application Data

(60) Provisional application No. 61/019,377, filed on Jan. 7, 2008.

(51) Int. Cl.
*G06F 1/00* (2006.01)
*G06F 13/00* (2006.01)
*H05K 5/00* (2006.01)
*H05K 7/00* (2006.01)

(52) U.S. Cl. ..... 713/300; 710/300; 710/303; 361/679.4; 361/679.41; 361/679.45

(58) Field of Classification Search .................. 713/300; 710/300, 303; 361/679.4, 679.41, 679.45
See application file for complete search history.

(56) References Cited

U.S. PATENT DOCUMENTS

| | | |
|---|---|---|
| 3,689,885 A | 9/1972 | Kaplan et al. |
| 3,938,018 A | 2/1976 | Dahl |
| 3,949,268 A | 4/1976 | von Mangoldt |
| 4,800,328 A | 1/1989 | Bolger et al. |
| 4,818,855 A | 4/1989 | Mongeon et al. |
| 5,229,652 A | 7/1993 | Hough |

(Continued)

FOREIGN PATENT DOCUMENTS

CN 2480996 Y 3/2002

(Continued)

OTHER PUBLICATIONS

Digital Wireless Telephone: User's Guide, 2001, Motorola.*

(Continued)

*Primary Examiner* — Mark Connolly
(74) *Attorney, Agent, or Firm* — Warner Norcross & Judd LLP

(57) ABSTRACT

A wireless power adapter that mounts to the docking station port of a portable computer, such as a laptop computer, notebook computer or tablet computer. The wireless power adapter includes a docking port electrical connector selected to interface with the pre-existing docking port electrical connector on the portable computer. The adapter docking port electrical connector includes power pins to connect with the pre-existing power pins of the portable computer docking port electrical connector. The wireless power adapter may include an inductive secondary to wirelessly receive power from an inductive primary. The wireless power adapter may include a mechanical connector that interfaces with the pre-existing docking station mechanical connector on the portable computer. The present invention may also include a remote inductive power supply having a base adapted to support the laptop and adapter combination. The base may includes inductive power supply circuitry and an inductive primary to produce an inductive field to wirelessly provide power to the adapter and ultimately the portable computer. The remote inductive power supply may alternatively be embedded within a work surface, such as a desktop.

17 Claims, 11 Drawing Sheets

U.S. PATENT DOCUMENTS

| | | |
|---|---|---|
| 5,341,280 A | 8/1994 | Divan et al. |
| 5,428,659 A | 6/1995 | Renner et al. |
| 5,455,466 A | 10/1995 | Parks et al. |
| 5,455,467 A | 10/1995 | Young et al. |
| 5,550,452 A | 8/1996 | Shirai et al. |
| 5,600,225 A | 2/1997 | Goto |
| 5,701,657 A | 12/1997 | Sakamoto |
| 5,734,254 A | 3/1998 | Stephens |
| 5,814,900 A | 9/1998 | Esser et al. |
| 5,831,348 A | 11/1998 | Nishizawa |
| 5,959,433 A | 9/1999 | Rohde |
| 5,982,764 A | 11/1999 | Palermo et al. |
| 6,028,555 A | 2/2000 | Harano |
| 6,057,668 A | 5/2000 | Chao |
| 6,127,799 A | 10/2000 | Krishnan |
| 6,208,115 B1 | 3/2001 | Binder |
| 6,252,380 B1 | 6/2001 | Koenck |
| 6,265,791 B1 | 7/2001 | Eberl et al. |
| 6,275,681 B1 | 8/2001 | Vega et al. |
| 6,301,128 B1 | 10/2001 | Jang et al. |
| 6,323,775 B1 | 11/2001 | Hansson |
| 6,424,124 B2 | 7/2002 | Ichihara et al. |
| 6,429,622 B1 | 8/2002 | Svensson |
| 6,462,432 B1 | 10/2002 | Seelig et al. |
| 6,597,076 B2 | 7/2003 | Scheible et al. |
| 6,683,438 B2 | 1/2004 | Park et al. |
| 6,703,920 B2 | 3/2004 | Zimmer |
| 6,803,744 B1 | 10/2004 | Sabo |
| 6,821,670 B2 | 11/2004 | Hsueh |
| 6,844,702 B2 | 1/2005 | Giannopoulos et al. |
| 6,977,479 B2 | 12/2005 | Hsu |
| 7,164,255 B2 | 1/2007 | Hui |
| 7,392,068 B2 | 6/2008 | Dayan et al. |
| 7,936,147 B2 | 5/2011 | Kook |
| 2002/0042291 A1 | 4/2002 | Lahteenmaki et al. |
| 2002/0057584 A1 | 5/2002 | Brockmann |
| 2002/0082059 A1 | 6/2002 | Nariai et al. |
| 2002/0089305 A1 | 7/2002 | Park et al. |
| 2002/0099894 A1 | 7/2002 | Kehoe et al. |
| 2003/0006880 A1 | 1/2003 | Zimmer |
| 2003/0015479 A1* | 1/2003 | Kuennen et al. ............ 210/748 |
| 2003/0090239 A1 | 5/2003 | Sakakibara |
| 2003/0128010 A1 | 7/2003 | Hsu |
| 2003/0132731 A1 | 7/2003 | Chung |
| 2003/0231001 A1 | 12/2003 | Bruning |
| 2004/0048511 A1 | 3/2004 | Dayan et al. |
| 2004/0054941 A1 | 3/2004 | Seiler et al. |
| 2004/0066169 A1 | 4/2004 | Bruning |
| 2004/0082369 A1 | 4/2004 | Dayan et al. |
| 2004/0130425 A1 | 7/2004 | Dayan et al. |
| 2004/0130916 A1* | 7/2004 | Baarman ............... 363/21.02 |
| 2004/0131928 A1 | 7/2004 | Dayan et al. |
| 2004/0142726 A1 | 7/2004 | Dayan et al. |
| 2004/0142733 A1 | 7/2004 | Parise |
| 2004/0150934 A1 | 8/2004 | Baarman |
| 2004/0240696 A1 | 12/2004 | Shively et al. |
| 2005/0127868 A1* | 6/2005 | Calhoon et al. ............ 320/108 |
| 2005/0127869 A1 | 6/2005 | Calhoon et al. |
| 2005/0162824 A1* | 7/2005 | Thompson ............... 361/686 |
| 2005/0189910 A1 | 9/2005 | Hui |
| 2005/0192062 A1 | 9/2005 | Mickle et al. |
| 2006/0205381 A1 | 9/2006 | Beart et al. |
| 2007/0032274 A1 | 2/2007 | Lee et al. |
| 2007/0035917 A1* | 2/2007 | Hotelling et al. .......... 361/683 |
| 2007/0072474 A1* | 3/2007 | Beasley et al. ............. 439/332 |
| 2007/0178945 A1 | 8/2007 | Cook et al. |
| 2009/0179501 A1 | 7/2009 | Randall |
| 2011/0075350 A1* | 3/2011 | Lindblad et al. ........ 361/679.41 |

FOREIGN PATENT DOCUMENTS

| | | |
|---|---|---|
| EP | 0558316 | 2/1993 |
| EP | 0793164 | 9/1997 |
| EP | 1096641 | 5/2001 |
| EP | 1221753 | 7/2002 |
| EP | 1117068 | 10/2007 |
| GB | 0210886.8 | 5/2002 |
| GB | 0213024.3 | 6/2002 |
| GB | 0213374.2 | 6/2002 |
| GB | 0225006.6 | 10/2002 |
| GB | 0228425.5 | 12/2002 |
| GB | 2388715 | 11/2003 |
| GB | 2388716 | 11/2003 |
| GB | 2389720 | 12/2003 |
| GB | 2389767 | 12/2003 |
| GB | 2399466 | 9/2004 |
| JP | H06005231 | 1/1994 |
| JP | 3011829 | 3/1995 |
| JP | 09190938 | 7/1997 |
| JP | 10233235 | 9/1998 |
| JP | 11168837 | 6/1999 |
| JP | 2000166112 | 6/2000 |
| JP | 2000287375 | 10/2000 |
| JP | 2001060998 | 3/2001 |
| JP | 2001251207 | 9/2001 |
| JP | 2001268823 | 9/2001 |
| JP | 2001352698 | 12/2001 |
| JP | 2002148325 | 5/2002 |
| JP | 2002262468 | 11/2002 |
| JP | 2002325367 | 11/2002 |
| JP | 2002359676 | 12/2002 |
| WO | 9602879 | 2/1996 |
| WO | 0054387 | 9/2000 |
| WO | 0180396 | 10/2001 |
| WO | 02095555 | 11/2002 |
| WO | 03075415 | 9/2003 |
| WO | 03075416 | 9/2003 |
| WO | 03096361 | 11/2003 |
| WO | 03096512 | 11/2003 |
| WO | 03105308 | 12/2003 |
| WO | 2004015885 | 2/2004 |
| WO | 2004027656 | 4/2004 |
| WO | 2004036774 | 4/2004 |
| WO | 2004055654 | 7/2004 |
| WO | 2007/090168 | 8/2007 |

OTHER PUBLICATIONS

Scott; "Networked Surfaces: A Novel LAN Technology;" Sep. 25, 2002 Dissertation; pp. TOC and 1-184.

Hoffman et al; "Data Transport on the Networked Surface;" Laboratory for Communications Engineering—University of Cambridge.

Scott et al; "Networked Surfaces: A New Concept in Mobile Networking;" Laboratory for Communications Engineering—Cambridge University Engineering Department; Oct. 24, 2001.

Scott et al; "Networked Surfaces: A New Concept in Mobile Networking;" Laboratory for Communications Engineering—Cambridge University Engineering Department.

Hoffman et al; "Location of Mobile Devices Using Networked Surfaces;" Laboratory for Communications Engineering—Cambridge University Engineering Department.

Arnold Fixed My Mousepad Charger web page printed Jun. 17, 2003.

Gulko, Michael, et al, Inductor-Controlled Current-Sourcing Resonant Inverter and its Application as a High Pressure Discharge Lamp Drive, IEEE, pp. 434-440, May 1994.

English Abstract of Japanese Patent Publication No. 11-168837.
English Abstract of Japanese Patent Publication No. 10-233235.
English Abstract of Japanese Patent Publication No. 2000-287375.
English Abstract of Japanese Patent Publication No. 2001-268823.

* cited by examiner

WIRELESS POWER ADAPTER FOR COMPUTER

This application claims the benefit of U.S. Provisional Application No. 61/019,377, filed on Jan. 7, 2008.

The present invention relates to computer accessories and more particularly to an adapter for wirelessly supplying power to a portable computer.

Portable computers, such as laptop computers, are intended to provide users with an enhanced degree of convenience and portability. Many of the benefits of a portable computer stem from the use of batteries that allow the computer to operate for a limited period of time without being plugged into a power source, such as a wall outlet. Through improvements in technology, battery-life for portable computers continues to grow. Despite the progress made in terms of battery-life, batteries still need to be charged regularly, and the charging process can take a significant length of time. This is particularly true as portable computers are increasingly linked to networks through wireless connections, such as WiFi and Bluetooth. These wireless network connections generally require significant additional power shortening the amount of time a portable computer can run on a single battery charge.

Typically, portable computers are charged either by connecting a simple power supply to a power supply input on the portable computer or by placing a portable computer in a docking station so that it can be charged through dedicated power supply pins incorporated into the docking station. A conventional power supply includes a wall plug, a transformer for converting wall power into a form suitable for the portable computer and a computer plug for connecting the transformer to the portable computer. Although relatively simple, power supplies are inconvenient for a variety of reasons. For example, they include cords that must be plugged into the wall and into the portable computer, each time use is desired. In addition, a user is required to carry the power supply around separate from the computer so that it can be used when needed. The cords may tangle and are unsightly when in use. Further, when connected to portable computer, the power supply cords can limit freedom of the computer. Unlike a simple power supply, which supplies power, but does nothing else to enhance the capabilities/usability of the portable computer, a typical docking station includes a series of ports and connectors that can be used to establish a desktop work environment for the portable computer. For example, a docking station may include a power input (to receive power from an outside power source, such as a power supply of the type described above), one or more ports for driving an exterior monitor, an input for an external full-size keyboard and a collection of USB ports. The power cord, monitor cord and other accessories will typically remain plugged into the docking station at all times so that the computer is simultaneously connected to all of these accessories when it is docked.

Conventional docking stations are typically provided with a single docking port electrical connector that has a plurality of terminals sufficient for all of the desired docking station features, such as power supply, monitor output and USB connections. To facilitate operation with the docking stations, the portable computer includes a matching electrical connector that is positioned to electrically interconnect with the docking station port when the portable computer is docked. For security and ease of use, most docking stations also include a set of mechanical connectors that mechanically secure the computer in place on the docking station. Among other things, the mechanical connectors help to ensure a good interconnection between the docking station port and the corresponding computer port, and help to reduce the likelihood of damage to the connectors if the computer is moved while it is in the docking station. Although docking station ports provide an important mechanism to charge/power and temporarily enhance the features and usability of a portable computer, the cords and plugs inserted into the docking station significantly limit the mobility of the docking station and consequently any portable computer docked in the docking station. This is true even when a user simply wants to charge or power the portable computer and does not need the additional features commonly associated with a docking station.

SUMMARY OF THE INVENTION

The present invention provides a wireless power adapter that mounts to the docking station port of a portable computer, such as a laptop computer, notebook computer or tablet computer. The wireless power adapter includes a docking port electrical connector selected to interface with the pre-existing docking port electrical connector on the portable computer. The adapter docking port electrical connector includes power pins to connect with the pre-existing power pins of the portable computer docking port electrical connector.

In one embodiment, the wireless power adapter includes an inductive secondary to wirelessly receive power from an inductive primary. The wireless power adapter may include circuitry for transforming and/or conditioning the input power received from the primary to provide the desired output power to the portable computer.

In one embodiment, the wireless power adapter includes a mechanical connector that interfaces with the pre-existing docking station mechanical connector on the portable computer. The mechanical connector may include one or more latches to selectively secure the adapter to the portable computer. The wireless power adapter may include slide levers or other mechanisms for operating the mechanical connector.

In one embodiment, the wireless power adapter includes one or more accessory ports, plugs or receptacles, such as USB ports, monitor receptacles, mouse ports, CAT 5 receptacles, modem receptacles, headphone jacks and microphone jacks. These accessories ports, plugs and receptacles may be connected to the adapter docking port electrical connector to interconnect the accessories to the appropriate portable computer docking port connector pins.

In one embodiment, the present invention includes a remote inductive power supply. The remote inductive power supply may include an inductive power supply base adapted to support the laptop and adapter combination. The base includes inductive power supply circuitry and an inductive primary to produce an inductive field to wirelessly provide power to the adapter and ultimately the laptop. The base may include a support surface that corresponds in shape with the undersurface of the adapter so that the laptop and adapter closely interfit with the base. The base may include a power cord to receive power from a wall outlet, either directly or indirectly, such as through a power transformer.

In one embodiment, the remote inductive power supply is embedded within a work surface, such as a desktop. The desktop may house power supply circuitry and an inductive primary. The power supply circuitry may include a power cord to receive power from a wall outlet, either directly or indirectly, such as through a power transformer. The desktop may include a locator mechanism to assist in positioning the portable computer with the secondary closely aligned with the primary. In one embodiment, the locator mechanism includes pins or other physical locating structure disposed on the desktop. In another embodiment, the locator mechanism includes paired magnets in the wireless adapter and in the desktop.

The present invention provides a simple and effective adapter for providing wireless power to a portable computer. The wireless adapter electrically connects to the portable computer using the pre-existing docking port connector, thereby utilizing pre-existing hardware and eliminating the need for electrical cords plugged into the AC power cord receptacle. The wireless adapter may also be mechanically secured to the portable computer using the pre-existing docking station connection structure, thereby eliminating the need for new or additional connection hardware. The wireless adapter may provide additional convenience by including one or more accessory plugs, ports and receptacles that can be used to connect accessories to the portable computer in essentially the same manner as a docking station.

These and other objects, advantages, and features of the invention will be readily understood and appreciated by reference to the detailed description of the current embodiment and the drawings.

DETAILED DESCRIPTION OF CURRENT EMBODIMENTS

I. Overview

Figure 1:
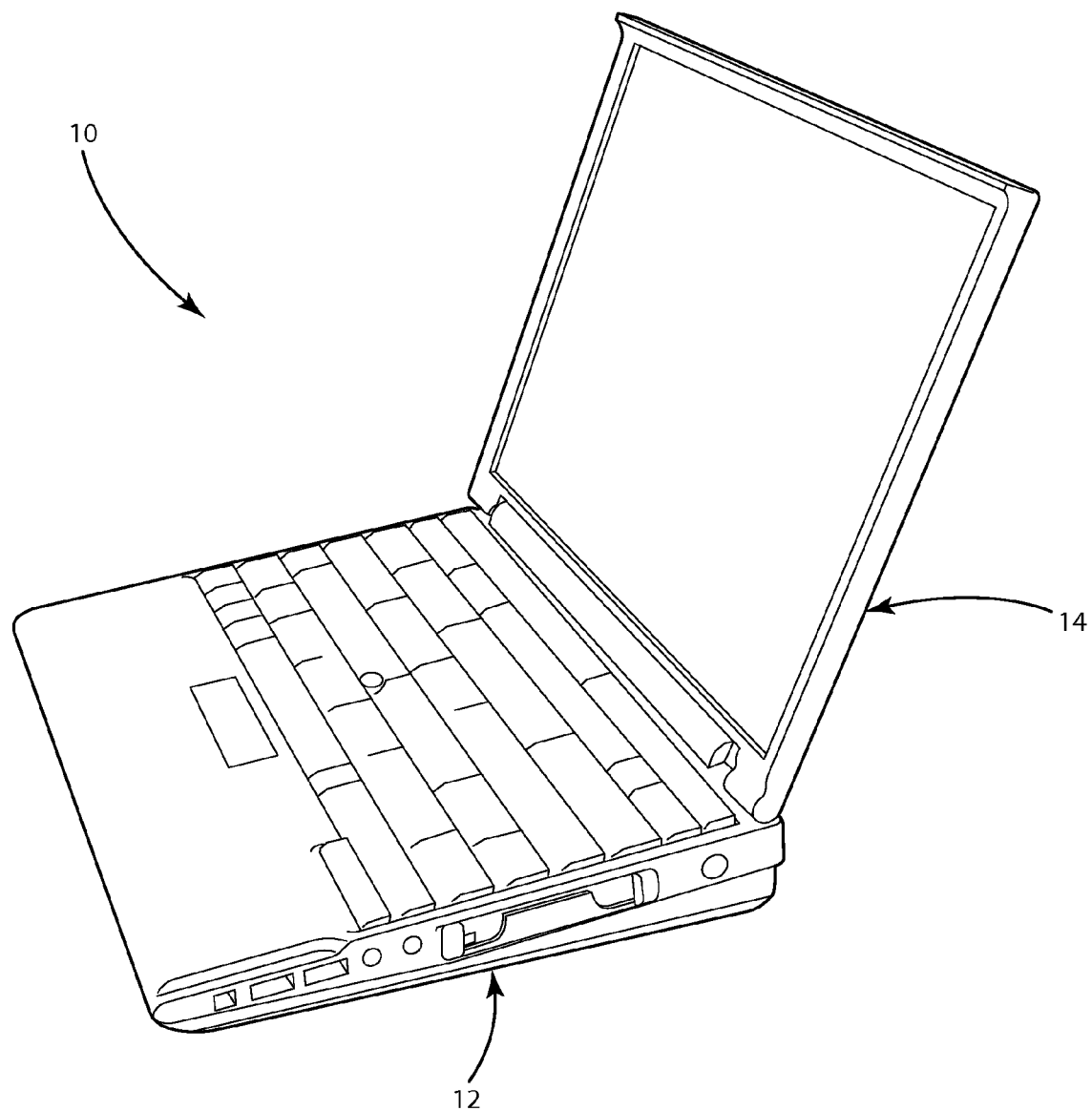
FIG. 1 is a photograph of a portable computer and a wireless adapter in accordance with an embodiment of the present invention taken from a top, right front perspective.
Figure 2A:
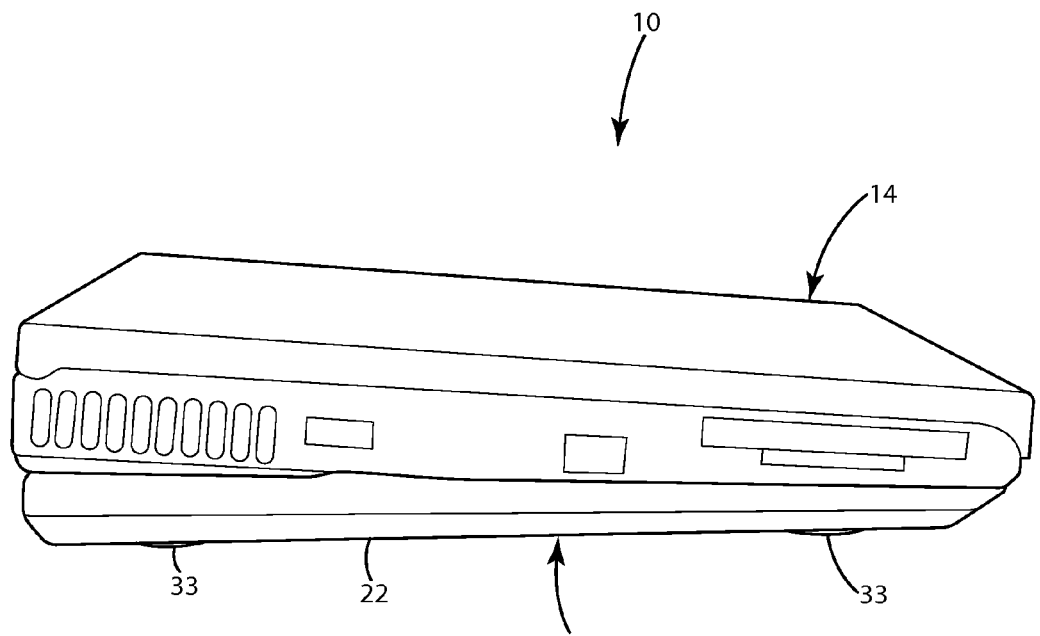
FIG. 2A is a photograph showing the computer and adapter taken from a top left perspective.
Figure 2B:
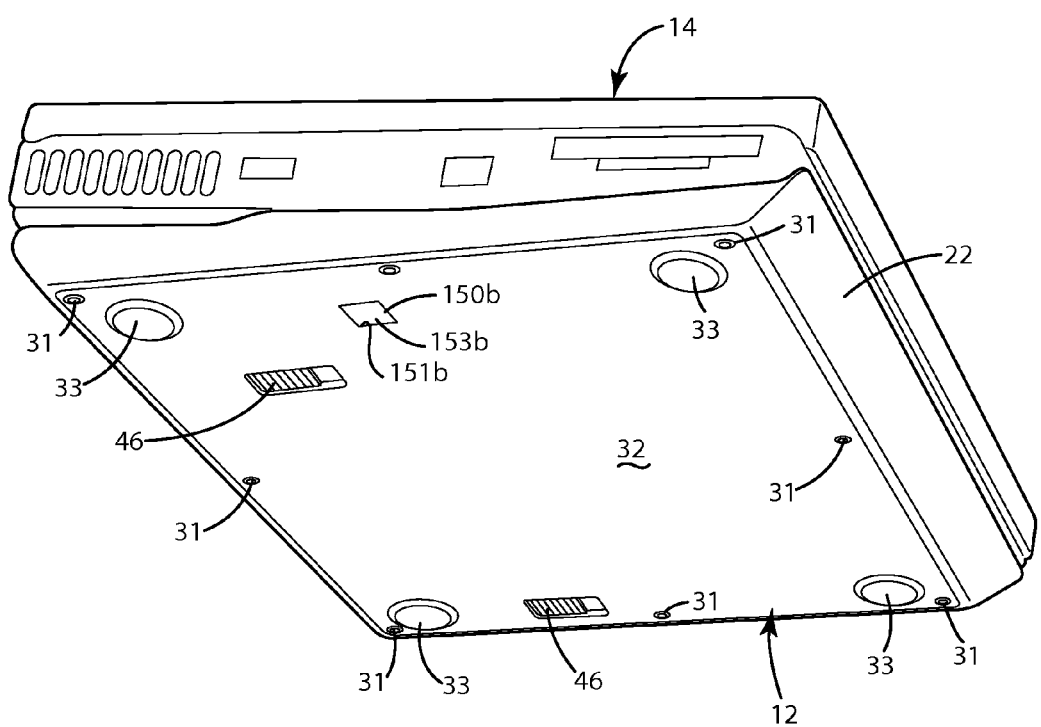
FIG. 2B is a photograph showing the computer and adapter taken from a bottom left perspective.
Figure 3:
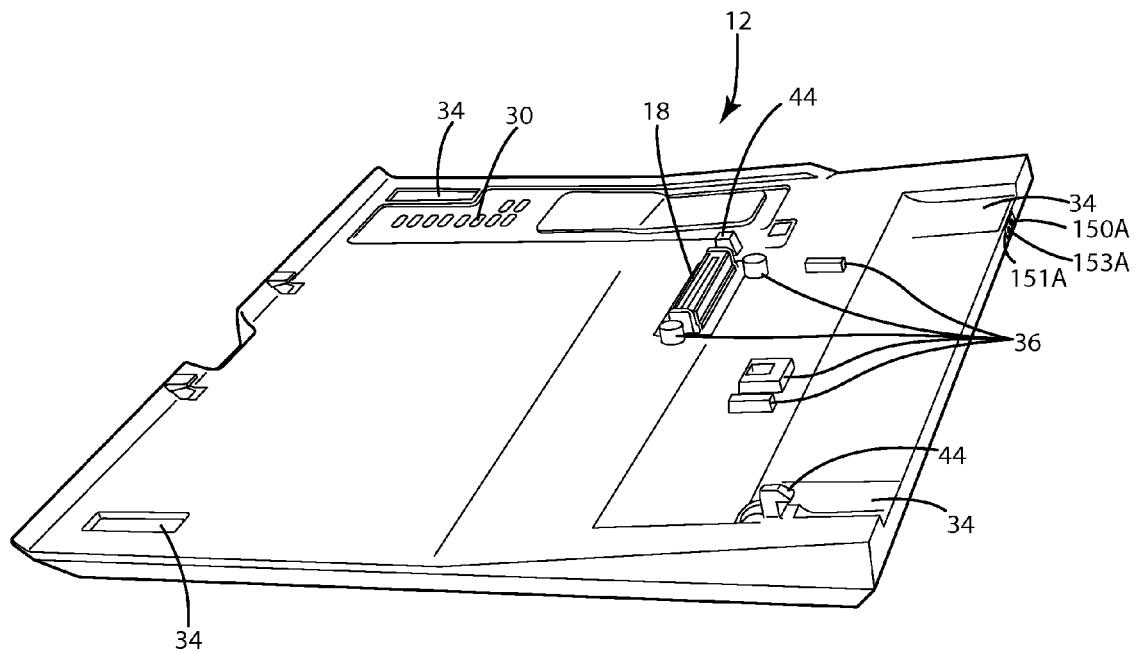
FIG. 3 is a photograph of the top surface of the adapter taken from a top, right rear perspective.
Figure 4:
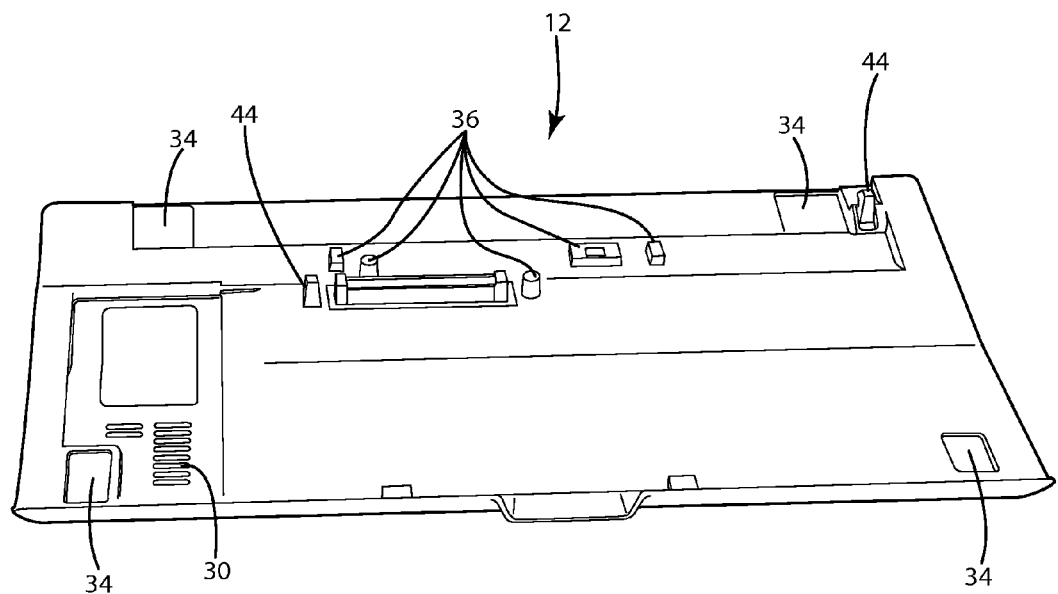
FIG. 4 is a second photograph of the top surface of the adapter taken from a top front perspective.

A portable computer and wireless power adapter combination in accordance with an embodiment of the present invention is shown in FIGS. 1 and 2A-B, and generally designated 10. The wireless power adapter 12 includes internal electronics 16 for wirelessly receiving power from a remote inductive power supply and for transforming the received power into power suitable for the computer 14 (See FIG. 5A). As shown in FIGS. 3 and 4, the wireless power adapter 12 includes an electrical connector 18 for supplying power to the computer 14 via the electrical connector (not shown) provided on the computer 14 for connection with a docking station (not shown). Referring again to FIGS. 3 and 4, the wireless power adapter 12 may include a mechanical connector 20, and may be mounted to the undersurface of the computer 14 using the mechanical connectors (not shown) provided on the computer 14 for connection with a docking station (not shown).

The present invention is described in connection with a wireless power adapter configured to interface with a Lenovo® laptop computer. Accordingly, the present invention is described in connection with electrical and mechanical connectors appropriate for connection to a Lenovo® laptop computer. The illustrated wireless adapter is also configured to correspond in size and shape with a Lenovo® laptop computer. The present invention may be readily adapted for use with essentially any other portable computers. For example, the wireless adapter may be modified to incorporate electrical and mechanical connectors appropriate for essentially any other portable computer. The present invention may also be re-sized and re-shaped to correspond with essentially any other portable computer.

II. Wireless Power Adapter

The wireless power adapter 12 generally includes a housing 22 and internal electronics 16. The illustrated housing 22 is intended to provide a low profile adapter that can be mounted to the undersurface of a computer 14 with only limited impact on the size and weight of the computer 14. The housing 22 may be shaped to provide an aesthetically pleasing visual appearance. The top of the housing 22 may be contoured to follow the shape of the undersurface of the computer 14. For example, the housing 22 may define recesses 34 to receive the feet (not shown) of the computer 14. As another example, the housing 22 may include protrusions 36 that interfit with corresponding voids (not shown) in the bottom of the computer 14. In the illustrated embodiment, the housing 22 is substantially coextensive with the undersurface of the computer 14. The housing 22 may, however, extend over only a portion of the undersurface of the computer 14. If desired, the housing 22 may define vent holes 30 to help reduce heat build-up associated with the electronics 16. The housing 22 may define an internal space 38 of sufficient size and shape to contain the internal electronics 16 (See FIG. 5C). As perhaps best shown in FIG. 2B, the housing 22 may include a bottom cover 32 to close the internal space 38. The bottom cover 32 may be removable, for example, by screws 31 or other fasteners. The bottom cover 32 may define vent holes (not shown) to allow heat to escape from within the internal space 38. The bottom cover 32 may include feet 33 and may also be shaped to interfit with structure containing the power supply circuitry (e.g. base 40 and desktop 42). The size, shape and configuration of the housing 22, including the bottom cover 32, may vary from application to application as desired.

Figure 5A:
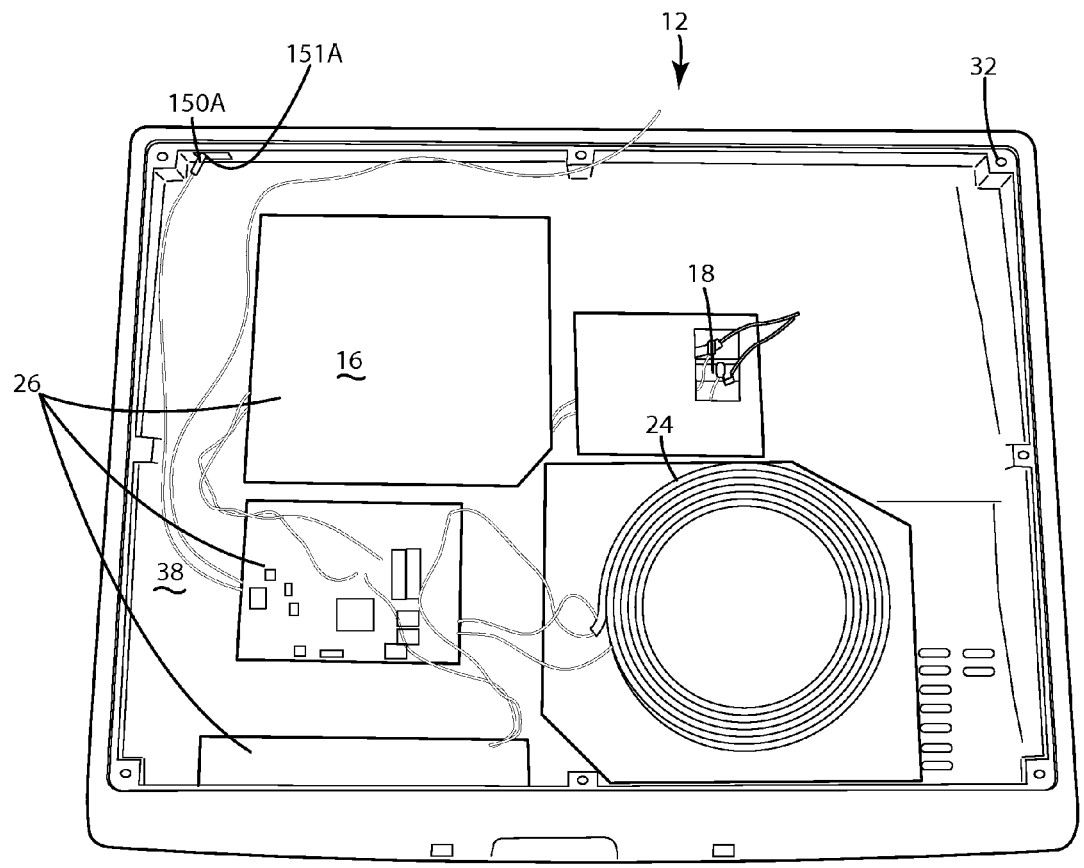
FIG. 5A is a photograph of the adapter with the bottom cover removed to show electronics taken from a bottom front perspective.
Figure 5B:
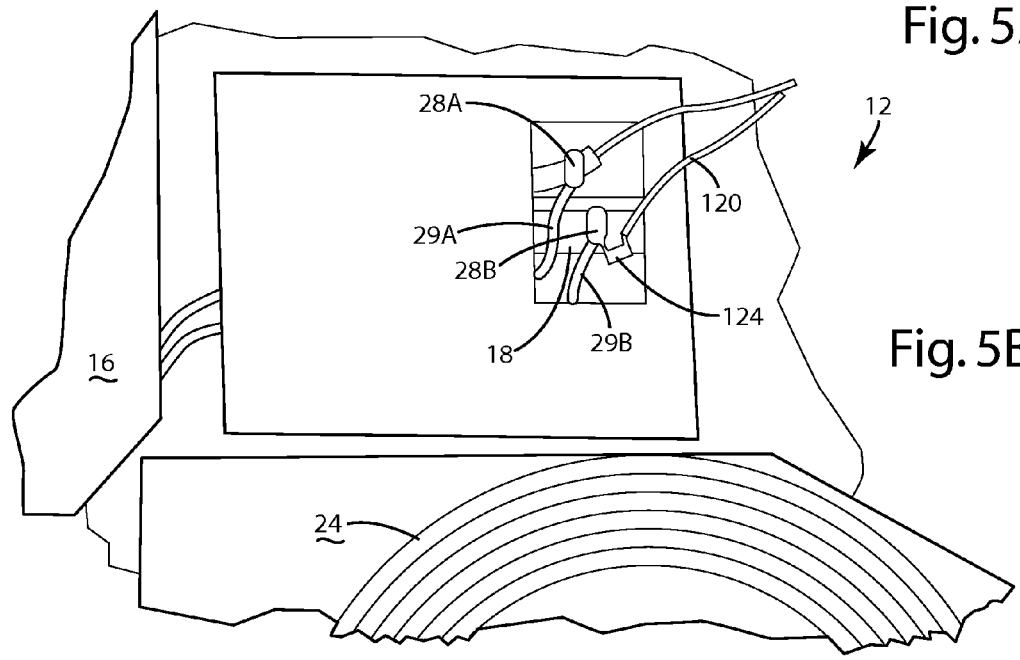
FIG. 5B is a photograph of a portion of the adapter with the bottom cover removed showing the electrical connector.
Figure 5C:
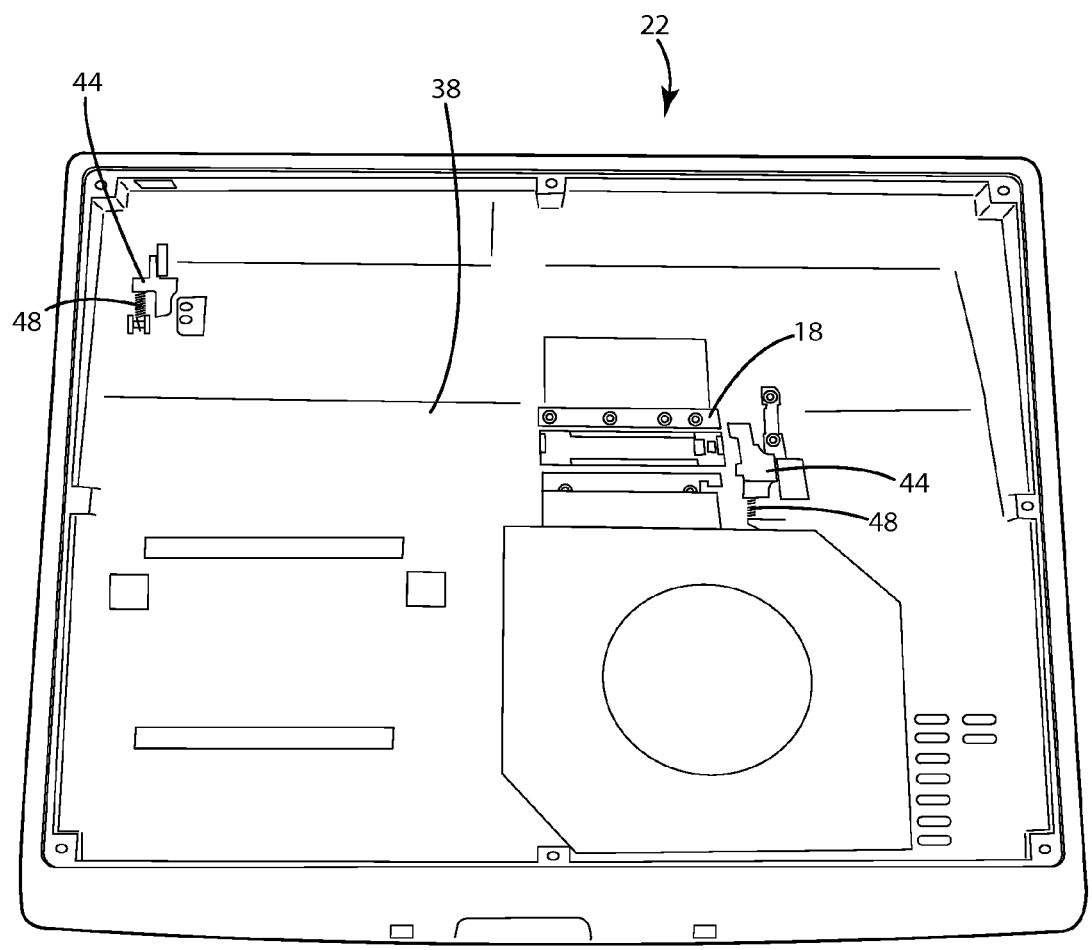
FIG. 5C is a photograph of the adapter with the bottom cover and electronics removed taken from a bottom front perspective.
Figure 5D:
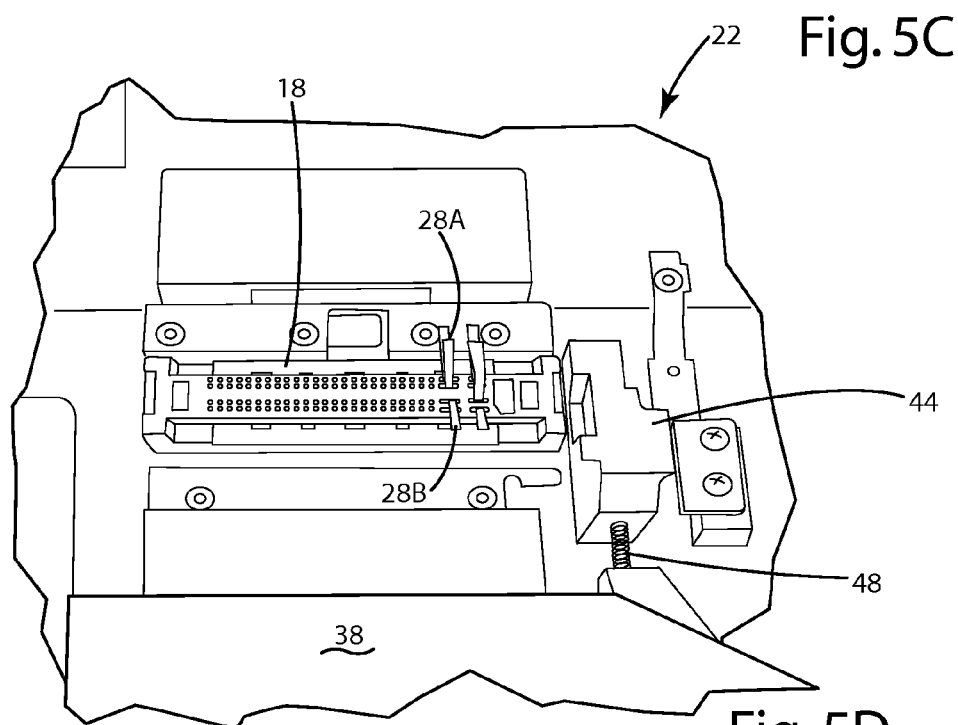
FIG. 5D is a photograph of a portion of the adapter with the bottom cover and electronics removed showing the electrical connector.
Figure 6:
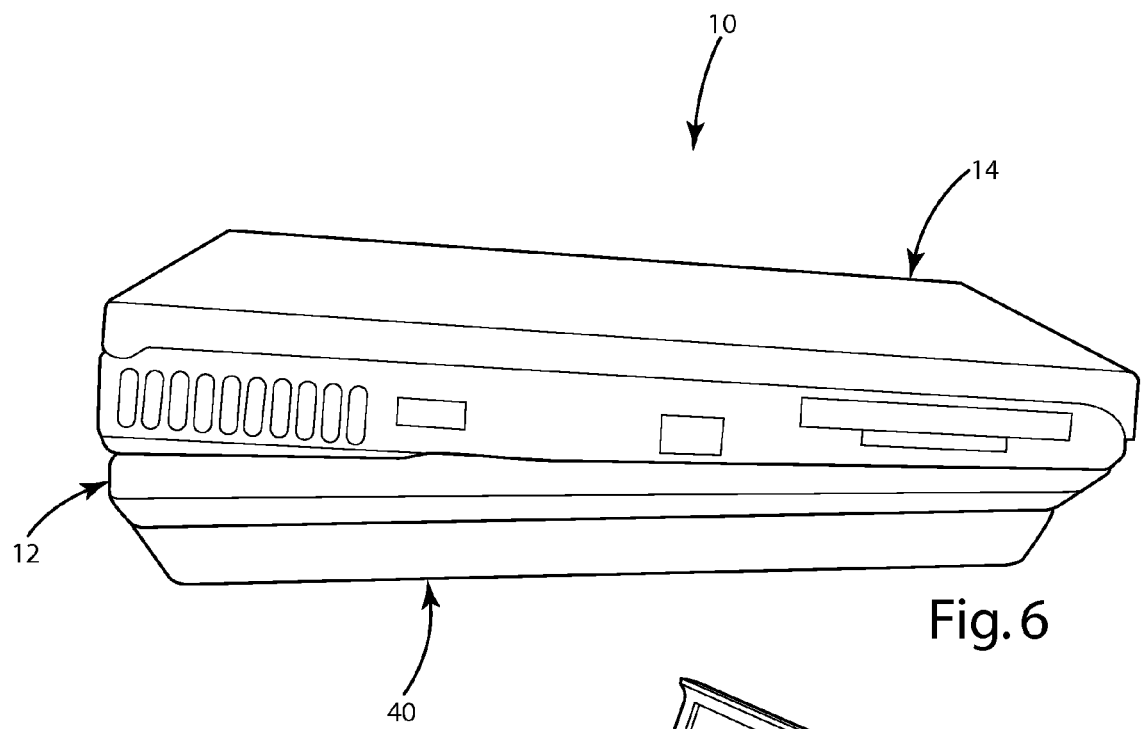
FIG. 6 is a photograph of the computer and adapter on a base taken from a top, front left perspective.
Figure 7:
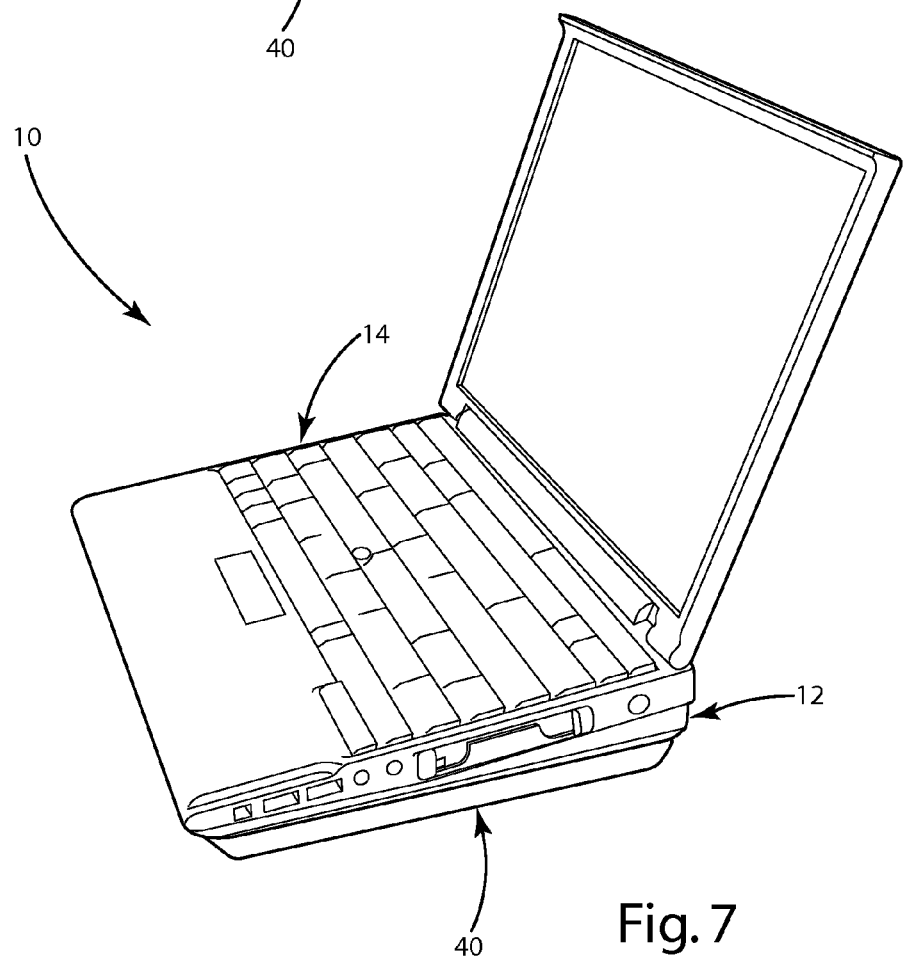
FIG. 7 is a photograph similar to that of FIG. 6 with the computer open.
Figure 8:
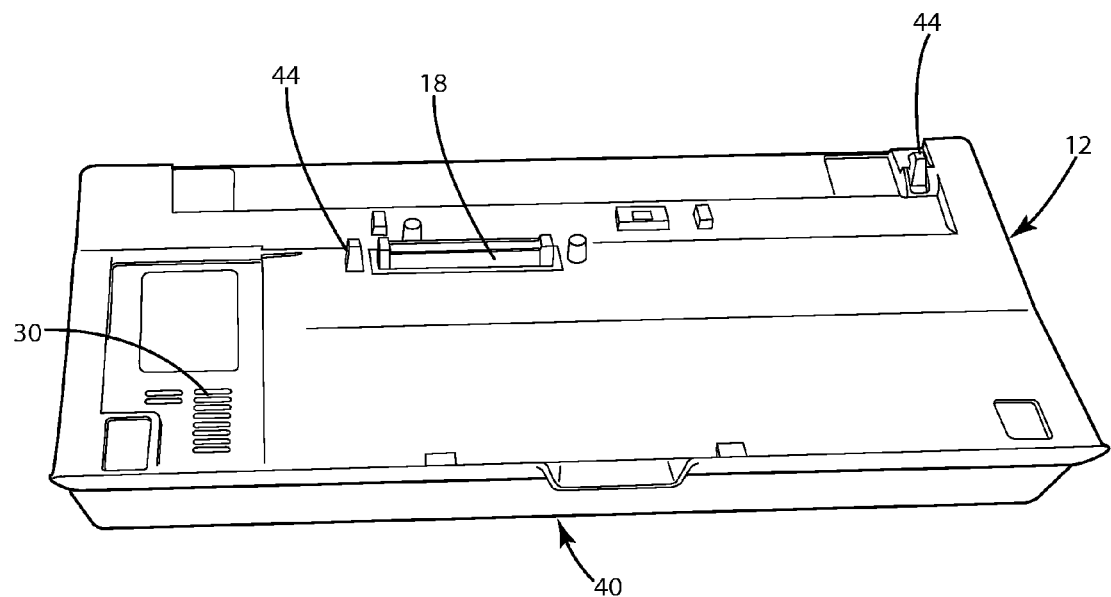
FIG. 8 is a photograph of the adapter on the base taken from a top front perspective.
Figure 9:
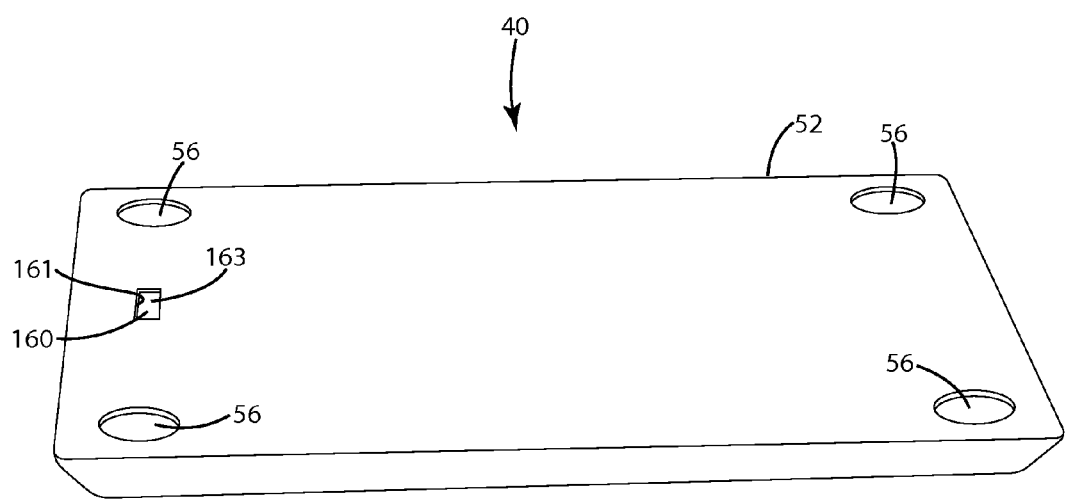
FIG. 9 is a photograph of the base taken form a top front perspective.
Figure 10:
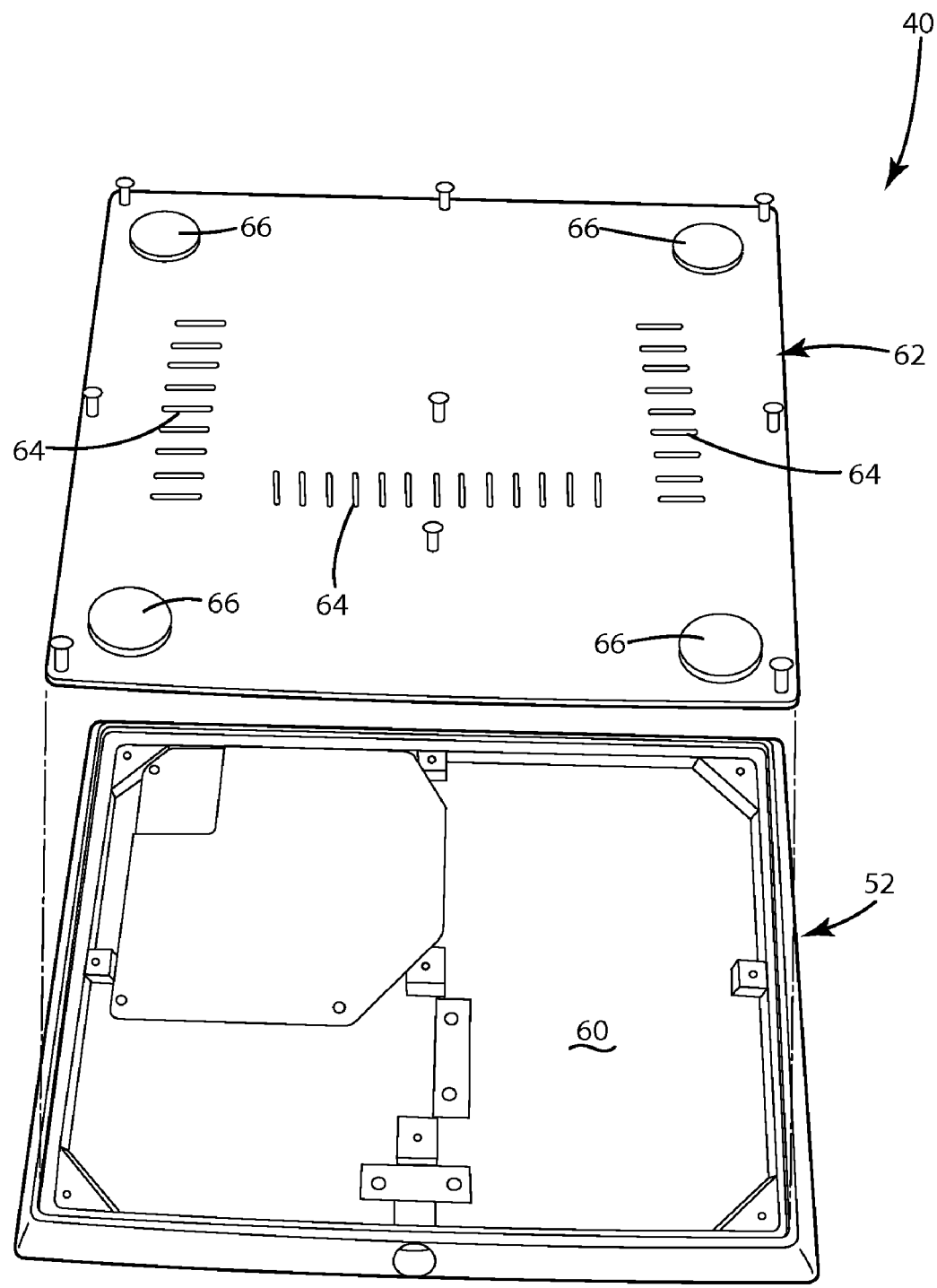
FIG. 10 is a photograph of the base and the bottom cover with the bottom cover and internal electronics removed.

Referring now to FIGS. 5A and 5B, the internal electronics 16 generally include a secondary 24 for generating electrical power in response to an inductive field and power supply electronics 26 for transforming power generated in the secondary 24 into a form suitable for powering the computer 14. The secondary 24 may be a coil of wire (such as Litz wire) as shown in FIG. 5A. Alternatively, the secondary 24 may be any other component capable of generating power in the presence of a suitable inductive field. In one embodiment, the wire coil secondary 24 may be replaced by a printed circuit board coil, such as a printed circuit board coil incorporating the invention principles of U.S. Ser. No. 60/975,953, which is entitled "Printed Circuit Board Coil" and filed on Sep. 28, 2007 by Baarman et al, and which is incorporated herein by reference in its entirety. The printed circuit board coil may provide a number of advantages. For example, a printed circuit board coil may permit the use of a thinner coil and thereby reduce the overall thickness of the adapter 12. A printed circuit board coil may also improve the efficiency of the wireless power transfer and reduce the overall cost of the system 10.

If desired, the present invention may utilize an inductive charging system that includes a communication link between the electronics 16 of the adapter 12 and the electronics of the remote inductive power supply (e.g. the electronics 54 in base 40 or the electronics 102 in the desktop 100). The communication link may be used to provide information from the adapter to the remote inductive power supply to facilitate proper and efficient operation of the system 10. For example, an inductive power supply system utilizing a communication link of this type is described in U.S. Ser. No. 61/019,411, entitled "Inductive Power Supply with Duty Cycle Control," which was filed by Baarman et al on Jan. 7, 2008, and which is incorporated herein by reference in its entirety. In the illustrated embodiment, the adapter 12 includes two infrared transmitters 150 that are used by the controller in the adapter 12 to transmit voltage and current information to the remote power supply in a manner consistent with U.S. Ser. No. 61/019,411. The two transmitters 150*a-b* are connected in parallel and provide two different locations from which the remote power supply can receive communications from the adapter 12. The first transmitter 150*a* is located in the rear of the housing 22 to provide a rear IR transmitter (See FIGS. 3 and 5A). As shown representatively in FIG. 3, the first transmitter 150*a* may be mounted to the housing 22 within a window 151*a* covered by an infrared lens 153*a*. The first transmitter 150*a* is partially visible in FIG. 5A. The first transmitter 150*a* provides a communication transmitter that is well suited for transmitting communications to the desktop 100 described below. The second transmitter 150*b* (shown only representatively in FIG. 3) is mounted to the bottom cover 32 of the adapter 12 to provide a bottom IR transmitter. The second transmitter 150*b* may be mounted to the bottom cover 32 within a window 151*b* covered by an infrared lens 153*b*. The second transmitter 150*b* is well suited for providing infrared communication to the base 40 described below. The number and location of transmitters may vary from application to application as desired. Although the present invention is illustrated with an infrared communication link, the present invention may incorporate other wireless communication technologies for transmitting information from the adapter 12 to the remote inductive power supply. In one alternative embodiment, communications can be transmitted to the remote inductive power supply using the existing primary and secondary as described in U.S. Ser. No. 61/019,411 (identified above), which as noted above is incorporated herein by reference in its entirety. In this alternative, the remote inductive power supply (e.g. electronics 54 in base 40 and electronics 102 in desktop 100) may include a current sensor (not identified by reference number) for sensing current variations in the tank circuit. In short, the adapter 12 may include a load subcircuit (not identified by reference number) that can be enabled and disabled to selectively increase the current draw in the adapter 12. The increased current draw is inherently communicated back to the remote inductive power supply in the form of increased reflected impedance. By selectively enabling and disabling the load subcircuit, the adapter 12 can create spikes in the reflected impedance. These spikes may be controlled to provide a data stream that is embedded in the reflected impedance of the adapter 12. The data stream may include information regarding the voltage and current in the adapter 12. The remote inductive power supply may include a controller (not identified by reference number) capable of interpreting data communications embedded in the tank circuit current variations. For example, the remote inductive power supply may include a current sense transformer (not identified by reference number) in the tank circuit (not identified by reference number) to provide a signal representative of the reflected impedance of the adapter 12. The output of the current sense transformer may be analyzed by a controller (not identified by reference number) to find the embedded communications. Near field communications and other RF communications can also be used as illustrated in U.S. Ser. No. 10/689,148, which is entitled "Adaptive Inductive Power Supply with Communication" and was filed on Oct. 20, 2003 by Baarman, and which is incorporated herein by reference in its entirety.

In the illustrated embodiment, the power supply electronics 26 are connected to the power supply pins 28*a-b* of the adapter electrical connector 18. To provide compatibility with pre-existing docking station connectors on the computer 14, the power supply electronics 26 may be secured to the pins 28*a-b* that correspond with the power supply pins on pre-existing docking station electrical connectors (not shown). As perhaps best shown in FIGS. 5A and 5B, the illustrated embodiment includes a hot wire 29*a* connected to hot pin 28*a* and a ground wire 29*b* connected to ground pin 28*b*. The power supply pins 28*a-b* may vary from application to application. For example, a wireless power adapter 12 configured for use with a computer other than a Lenova® may utilize a different electrical connector and a different pin configuration.

Additionally, some computers include a charger identification mechanism intended to prevent the computer from accepting power from a source of power that does not have the appropriate identification. In the illustrated embodiment, the computer 14 includes an identification pin (not shown) in the computer docking port electrical connector (not shown). To provide the appropriate identification signal to the computer 14 through the adapter electrical connector 18, a wire 120 is connected from the identification pin (not shown) to ground 122 through a resistor 124 (See FIG. 5B). The value of the resistor 124 is selected to provide the appropriate response to power applied by the computer 14 to the identification pin (not shown). Different computers may require different identification or validation components, and the present invention may be readily adapted to include essentially any desired identification or validation components.

As noted above, the wireless power adapter 12 may also include a mechanical connector 20 for mechanically interconnecting the wireless power adapter 12 and the computer 14. In the illustrated embodiment, the mechanical connector 20 includes a pair of latches 44 integrated into the housing 22. The latches 44 may be spring-loaded and configured to catch in corresponding apertures (not shown) on the bottom of the computer 14. As shown in FIG. 5, each latch 44 may include a slide lever 46 and a spring 48. The slide levers 46 are secured within tracks in the housing 22 and may be accessible from the bottom of the adapter 12 (see FIG. 2B). The levers 46 are configured so that manually sliding the levers 46 against the spring-bias disengaged the latches 44 from the computer 14, thereby allowing the adapter 12 to be easily removed from the computer 14. Although the illustrated embodiment includes two separate slide levers 46, the adapter 12 may alternatively be provided with a single lever to operate both latches 44. The mechanical connector 20 may vary from application to application as desired. In applications where the computer 14 has a pre-configured mechanical connector for securing the computer 14 to a docking station, the wireless power adapter 12 may incorporate a matching mechanical connector. If desired, the mechanical connector 20 may include a friction fit between the adapter 12 and the computer 14. The term "mechanical connector" is intended to encompass any structure for physically interconnecting the wireless power adapter 12 and the computer 14, and is not limited to strictly mechanical structures. For example, the mechanical connector may include magnets, electromagnets and other components that might not be considered "mechanical" in a strict sense of the word.

The wireless power adapter 12 may receive power from essentially any inductive remote power source. In general, the electronics 16 in the adapter 12 will be designed to match the electronics in the inductive remote power source. Although the power supply system may vary from application to application, the efficiency at which power is supplied to the computer may vary depending on a variety of characteristics, including the characteristics of the power supply system (e.g. the circuitry in the adapter 12 and the circuitry in the inductive remote power source), the degree of physical alignment between the primary and secondary and the degree of tuning between the circuitry of the inductive remote power supply and the adapter. It may be desirable to use a power supply system including the resonant seeking capabilities of the inductive power supply system disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; or U.S. Ser. No. 10/689,148 (identified above)—all of which are incorporated herein by reference in their entirety. It may be desirable to use a power supply having frequency and duty cycle control as disclosed in U.S. Ser. No. 61/019,411 (identified above).

Additionally, the wireless power adapter 12 may include one or more accessory ports, plugs or receptacles, such as USB ports, monitor receptacles, mouse ports, CAT 5 jacks, modem receptacles, headphone jacks and microphone jacks. These accessory ports, plugs, jacks and receptacles may be incorporated into the housing 22 and connected to the adapter docking port electrical connector 18 in essentially the same manner that they are incorporated into existing docking stations. For example, a USB port incorporated into the adapter 12 may be connected to the pins (not shown) on electrical connector 18 that are intended for use with a USB port on a docking station. Accordingly, the ports, plugs, jacks and receptacles will permit accessories to be connected to the computer 14 through the appropriate portable computer docking port connector pins (not shown).

III. Wireless Power Supply

As noted above, the wireless power adapter 12 may be configured to receive power from essentially any remote inductive power supply suitable for use with the internal electronics 16 of the adapter 12. In the embodiment of FIGS. 6-11, the wireless power adapter 12 is shown in conjunction with a dedicated wireless power supply base 40. The base 40 generally includes a housing 52 and power supply circuitry 54. The illustrated housing 52 is intended to provide a low profile base that can receive the adapter 12/computer 14 combination and rest on a desktop or other support surface. The top of the housing 52 may be contoured to follow the shape of the undersurface of the adapter 12. For example, the housing 52 may define recesses 56 to receive the feet 33 of the adapter 12. The recesses 56 and/or other contours may be used to facilitate efficient operation of the system by providing alignment between the adapter 12 and the base 40 (and consequently the primary 70 and the secondary 24). In the illustrated embodiment, the housing 52 is substantially coextensive with the adapter 12 extending approximately the full length and width of the computer 14. The dimensions of the housing 52 may, however, vary from application to application as desired. The housing 52 may define vent holes (not shown) to help reduce heat build-up associated with the power supply electronics 54. The housing 52 may define an internal space 60 of sufficient size and shape to contain the power supply electronics 54. The housing 52 may include a bottom cover 62 to close the internal space 60. The bottom cover 62 may be removable, for example, by screws or other fasteners (not identified by reference numbers). The bottom cover 62 may define vent holes 64 to allow heat to escape from within the internal space 60. The bottom cover 62 may include feet 66. The size, shape and configuration of the housing 52, including the bottom cover 62, may vary from application to application as desired.

Figure 11A:
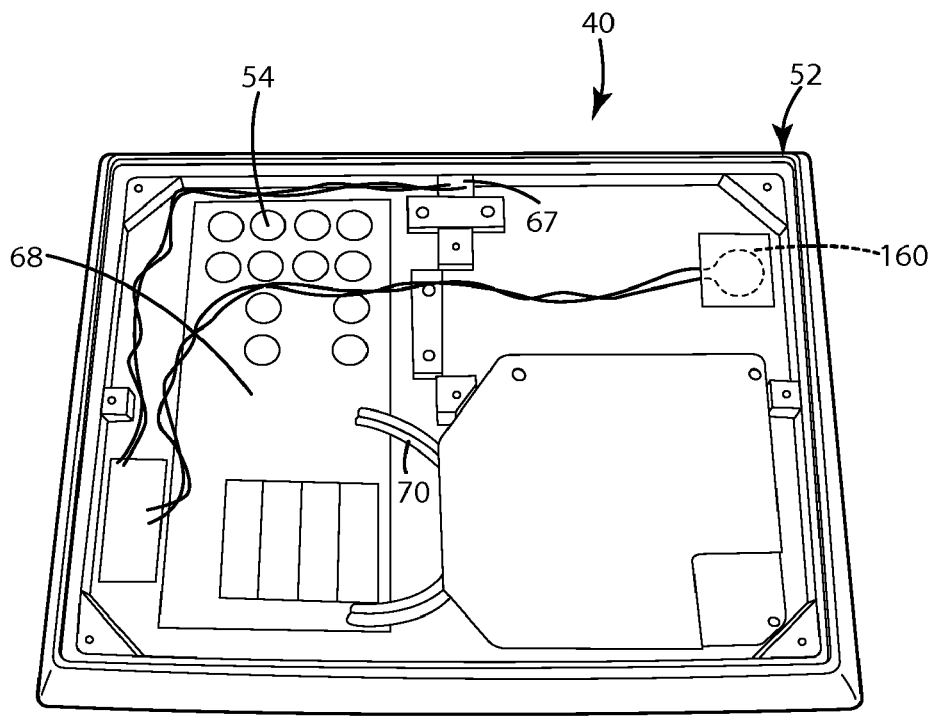
FIG. 11A is a photograph of the base with the bottom cover removed taken from a bottom front perspective.
Figure 11B:
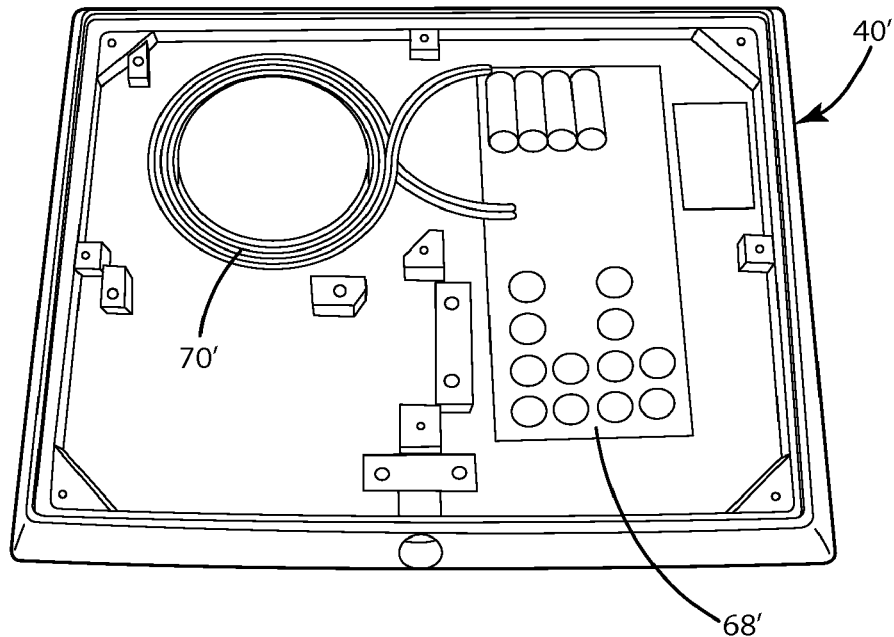
FIG. 11B is a photograph of the base of an alternative embodiment with the bottom cover removed to show the internal electronics taken from a bottom rear perspective.

The internal electronics 54 generally include inductive power supply circuitry 68 for generating an inductive field. The power supply circuitry 68 may include essentially any electronics capable of generating an inductive field. In the illustrated embodiment, the power supply circuitry 68 may generally includes a controller (not identified by reference number), a driver (not identified by reference number), a switching subcircuit (not identified by reference number) and tank circuit (not identified by reference number) with a primary 70. The primary 70 is not fully visible in FIG. 11A, but a substantially identical primary 70' is visible in FIG. 11B. FIG. 11B is an alternative base 40' with some different power supply circuitry 68' than FIG. 11A. FIG. 11B is included primarily to show the general position of primary 70' within the housing 52'. The primary 70 may be a coil of wire (such as Litz wire) as shown in FIG. 11B. Alternatively, the primary 70 may be any other component capable of generating a suitable inductive field. In one embodiment, the wire coil primary 70 may be replaced by a printed circuit board coil, as discussed above in connection with secondary 24.

As noted above, it may be desirable to use a power supply system including the resonant seeking capabilities of the inductive power supply system disclosed in U.S. Pat. No. 6,825,620 to Kuennen et al; the adaptive inductive power supply of U.S. Pat. No. 7,212,414 to Baarman; the adaptive inductive power supply of U.S. Ser. No. 10/689,148 to Baarman; or an inductive power supply with frequency and duty cycle control, such as that disclosed in U.S. Ser. No. 61/019, 411 (identified above). In the illustrated embodiment, the adapter 12 and remote inductive power supply include an inductive power supply with frequency and duty cycle control. This system includes an infrared communication link for transmitting voltage and/or current information from the adapter 12 to the remote inductive power supply. As shown in FIG. 11A, an infrared receiver 160 (beneath tape) may be mounted in the top of the housing 52 to receive infrared transmissions from the transmitter (not shown) in the bottom cover 32 of the adapter 12. The receiver 160 may be mounted in a window 161 in the housing 52 and covered by an infrared lens 163, which are representatively shown in FIG. 9. In the illustrated embodiment, the internal electronics 54 receive DC power from an external power supply (not shown), such as an external AC to DC power supply. The external power may be supplied to the internal electronics 54 through power jack 67 (See FIG. 11A). The external power supply may alternatively be incorporated directly into the internal electronics 54. It should be noted that the AC to DC power supply can be incorporated into the primary base with a direct AC cord. This would replace the AC to DC power supply described in connection with this embodiment.

Figure 12:
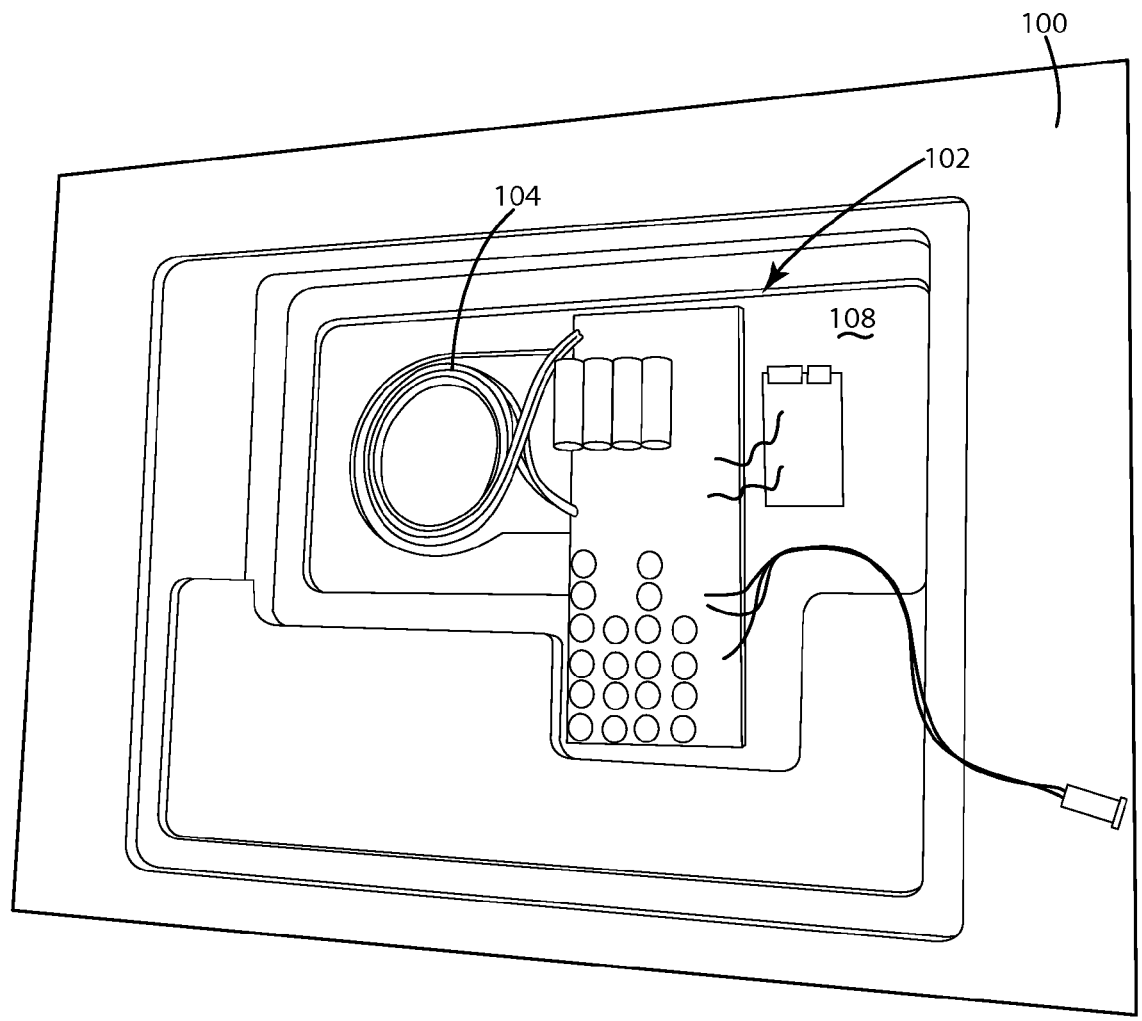
FIG. 12 is a photograph of a desktop with the cover removed to show internal electronics for providing inductive power to the adapter taken from a top front perspective.
Figure 13:
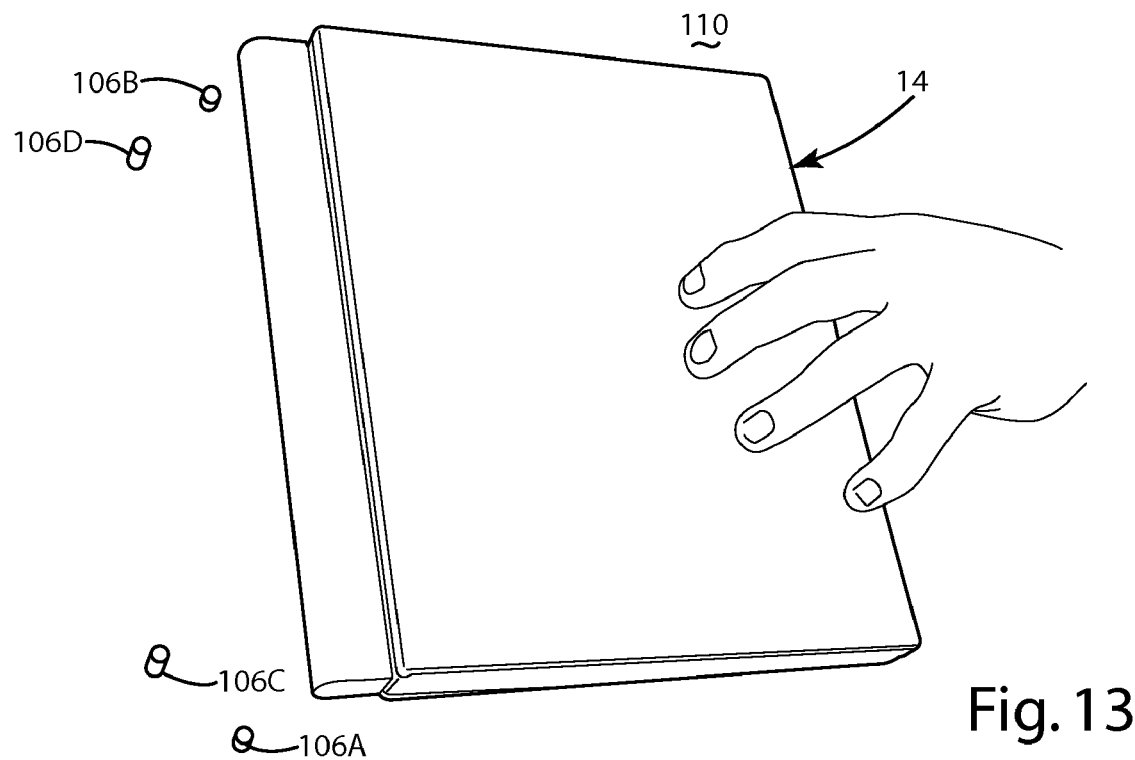
FIG. 13 is a photograph of a computer and adapter placed on a desktop with locator pins.
Figure 14:
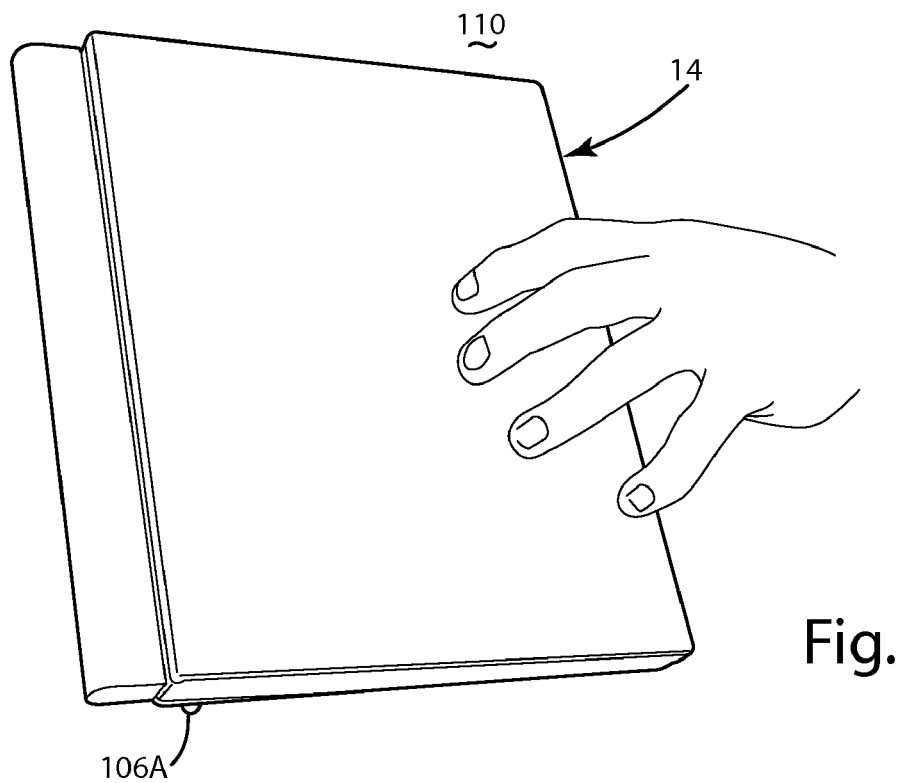
FIG. 14 is a photograph of a computer and adapter placed on a desktop in a location guided by the locator pins.

FIGS. 12-14 show a remote inductive power supply incorporated into a desktop 100. The inductive desktop 100 permits power to be wirelessly supplied to the adapter 12 without the need for a separate inductive base, such as base 40. In the illustrated embodiment, the desktop 100 defines an internal space 108 configured to receive the inductive power supply circuitry 102 (See FIG. 12). The internal space 108 is closed by a top panel 110 (See FIGS. 13 and 14). The inductive power supply circuitry 102 includes an inductive primary 104. The power supply circuitry 102 and primary 104 may be essentially identical to those of the base 40, and therefore will not be described in detail.

Referring now to FIGS. 13 and 14, the desktop 100 may include locator pins 106a-d that help to properly locate the secondary 24 with respect to the primary 104. As shown, the adapter 12/computer 14 combination can be fitted into place within the locator pins 106a-d to ensure proper alignment. The locator pins 106a-d may also have other functions. For example, the locator pins 106a-d may function as light pipes. In the illustrated embodiment, the power supply circuitry 102 may include LEDs (not shown) that are illuminated to provide status information to the user. A pair of LEDs may be positioned below locator pins 106a-b so that the light from the LEDs passes through the desktop 100 and causes the locator pins 106a-b to glow. Both LEDs may be illuminated upon the same status condition or the LEDs may be illuminated separately to indicate different status conditions. For example, two blue LEDs may be used to cause locator pins 106a-b to glow blue when power is being supplied to the adapter 12. Alternatively, different color LEDs may be used to denote different status conditions. For example, a blue LED may be used to denote when power is being supplied to the adapter 12 and a red LED may be used to denote a fault condition. The locator pins 106a-d may also be used to route infrared communications from the adapter 12 to the power supply circuitry 102. For example, locator pin 106c may be positioned to extend adjacent to the infrared transmitter 150a in the rear of the adapter housing 22. The locator pin 106c may collect and carry the infrared signals from the infrared transmitter 150 to an infrared receiver (not shown) mounted below the desktop 100.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A wireless power supply for a portable computer having a docking station port comprising:
   an adapter housing;
   a wireless power receiver disposed on or within said housing to wirelessly receive power from an external wireless power supply;
   a docking port electrical connector mounted to said housing and configured to selectively interface with the docking station port on the portable computer, said docking port electrical connector having power pins receiving power at least indirectly from said wireless power receiver; and
   at least one accessory port, plug or receptable, said at least one accessory port, plug or receptacle being coupled to said docking port electrical connector to interconnect with an appropriate computer docking port connector pin.

2. The wireless power supply of claim 1 wherein said wireless power receiver is further defined as an inductive secondary.

3. The wireless power supply of claim 2 wherein said adapter includes at least one of power transforming circuitry for transforming power generated in said wireless power receiver and power conditioning circuitry for conditioning generated in said wireless power receiver.

4. The wireless power supply of claim 1 wherein the portable computer include a mechanical connector for mechanically securing the portable computer to a docking station; and
   further including a wireless power supply mechanical connector releasably interconnectable with said mechanical connector on said portable computer, whereby the wireless power supply may be selectively mechanically connected to said portable computer.

5. The wireless power supply of claim 4 wherein said wireless power supply mechanical connector is further defined as at least one latch movable between a first position in which said latch is engaged with a corresponding mechanical connector on the portable computer and a second position in which said latch is disengage from said corresponding mechanical connector.

6. The wireless power supply of claim 5 wherein said latch is operatively connected to a user operable slide, said user operable slide selectively moving said latch between said first position and said second position.

7. The wireless power supply of claim 1 further including a communication transmitter for transmitting power information to a wireless power supply.

8. A wireless power supply for a portable computer having a docking station port comprising:
   an adapter housing;
   a wireless power receiver disposed on or within said housing to wirelessly receive power from an external wireless power supply;
   a docking port electrical connector mounted to said housing and configured to selectively interface with the docking station port on the portable computer, said docking port electrical connector having power pins receiving power at least indirectly from said wireless power receiver; and including a plurality of communication transmitters for transmitting power information to a wireless power supply.

9. A combination comprising:
a wireless power supply having an inductive primary, said power supply including circuitry for applying electricity to said primary, whereby said primary generates a varying electromagnetic field;
a portable computer having a docking station port configured to selectively interface with a docking station;
an adapter removably mounted to said portable computer, said adapter being removably placeable within said varying electromagnetic field, said adapter having an inductive secondary to wirelessly receive power from said power supply via said varying electromagnetic field, said adapter having a docking port electrical connector removably interfitted with said docking station port of said portable computer, said adapter having circuitry to communicate power generated in said secondary to said portable computer via said docking port electrical connector and said docking station port; and
a wireless communication link between said power supply and said adapter.

10. A combination comprising:
a wireless power supply having an inductive primary, said power supply including circuitry for applying electricity to said primary, whereby said primary generates a varying electromagnetic field;
a portable computer having a docking station port configured to selectively interface with a docking station;
an adapter removably mounted to said portable computer, said adapter being removably placeable within said varying electromagnetic field, said adapter having an inductive secondary to wirelessly receive power from said power supply via said varying electromagnetic field, said adapter having a docking port electrical connector removably interfitted with said docking station port of said portable computer, said adapter having circuitry to communicate power generated in said secondary to said portable computer via said docking port electrical connector and said docking station port; and
a wireless communication link between said power supply and said adapter, said adapter including at least two communication transmitters disposed at different locations.

11. A combination comprising:
a wireless power supply having an inductive primary, said power supply including circuitry for applying electricity to said primary, whereby said primary generates a varying electromagnetic field;
a portable computer having a docking station port configured to selectively interface with a docking station; and
an adapter removably mounted to said portable computer, said adapter being removably placeable within said varying electromagnetic field, said adapter having an inductive secondary to wirelessly receive power from said power supply via said varying electromagnetic field, said adapter having a docking port electrical connector removably interfitted with said docking station port of said portable computer, said adapter having circuitry to communicate power generated in said secondary to said portable computer via said docking port electrical connector and said docking station port,
wherein said adapter includes at least one accessory port, plug or receptacle, said at least one accessory port, plug or receptacle being coupled to said docking port electrical connector to interconnect with an appropriate computer docking port connector pin.

12. The combination of claim 11 wherein said portable computer includes a mechanical connector configured to selectively mechanically interconnect with a corresponding mechanical connector on a docking station; and
wherein said adapter includes a mechanical connector removably interconnected with said mechanical connector of said portable computer.

13. The combination of claim of claim 12 wherein said adapter includes at least one of power transforming circuitry for transforming power generated in said wireless power receiver and power conditioning circuitry for conditioning generated in said wireless power receiver.

14. The combination of claim 11 wherein said wireless power supply is disposed within a charging base, said base having an upper surface upon which said adapter may be removably placed to wirelessly receive power, said upper surface of said base contoured to correspond with an undersurface of said adapter.

15. A method for wirelessly supplying power to a portable computer having a docking station port, comprising the steps of:
interfitting an adapter to the portable computer, the adapter having a wireless power receiver and a docking port electrical connector, the docking port electrical connector being electrically coupled to power pins in the docking station port on the portable computer;
generating a varying electromagnetic field via a wireless power supply;
placing the adapter in the varying electromagnetic field, whereby the wireless power receiver generates power in response to the varying electromagnetic field;
applying power generated by the wireless power receiver to the portable computer via the docking port electrical connector and the power pins in the docking station port on the portable computer;
communicating power information from the adapter to the wireless power supply; and
varying at least one characteristic of the varying electromagnetic field in response to the power information received by the wireless power supply.

16. The method of claim 15 further comprising the step of mechanically interconnecting the adapter to the portable computer.

17. The method of claim 16 further comprising the step of transforming power generated by the wireless power receiver into a form appropriate for the portable computer before said applying step.

* * * * *